United States Patent [19]

Cuthbertson et al.

[11] 4,156,344
[45] May 29, 1979

[54] INLET GUIDE VANE BLEED SYSTEM

[75] Inventors: Robert D. Cuthbertson, Kirkland; Larry A. Schaut, Seattle, both of Wash.

[73] Assignee: The Boeing Company, Seattle, Wash.

[21] Appl. No.: 754,138

[22] Filed: Dec. 27, 1976

[51] Int. Cl.² .............................................. F02K 3/06
[52] U.S. Cl. ................................... 60/226 R; 60/269; 415/119; 415/145
[58] Field of Search ................ 60/226 R, 226 A, 262, 60/224, 269; 181/33 HA; 415/119, 144, 145, 52, 55, 57–59

[56] References Cited

U.S. PATENT DOCUMENTS

| | | | |
|---|---|---|---|
| 3,632,223 | 1/1972 | Hampton | 415/144 |
| 3,730,639 | 5/1973 | Moore | 415/119 |

*Primary Examiner*—Robert E. Garrett
*Attorney, Agent, or Firm*—A. R. Richardson; B. A. Donahue

[57] ABSTRACT

This invention is an improvement to a turbofan engine intended to reduce fan noise caused by the interaction of the rotor with secondary flow generated by the inlet guide vanes. A portion of the air flowing through the engine is removed from the fan duct from a region between the inlet guide vanes and the rotor and near the outer periphery of the fan duct by a system of bleed ducts. The ducts have one or more openings in the fan casing. The system may also include means for controlling the flow through the bleed ducts and means for injecting high energy flow into the bleed ducts to assist in ejecting the bleed flow.

1 Claim, 1 Drawing Figure

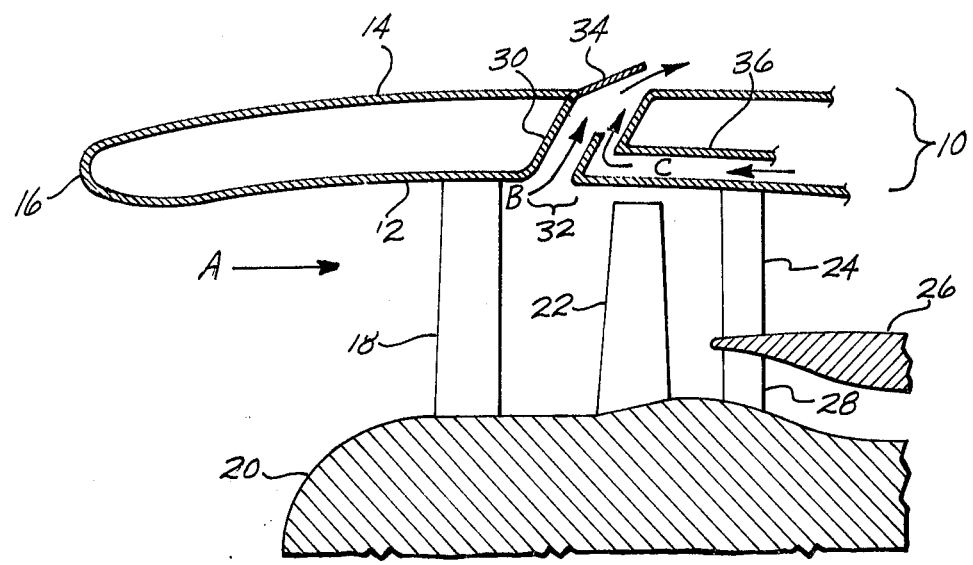

INLET GUIDE VANE BLEED SYSTEM

FIELD OF THE INVENTION

This invention relates generally to noise reduction devices for gas turbine engines, and more specifically to a means for controllably bleeding a portion of the air flowing through the fan duct from a region near the outer wall of the duct and between the inlet guide vanes and the rotor.

In recent years considerable effort has been made to reduce the noise emitted from jet engines, and at present, considerable attention is being focused on the fan stage of the engines. One source of noise in these fan sections is known to be the fan rotor, and it is generally felt that the rotor is the principal source of noise emitting from the forward part of the engine, or the forward arc, under all operating conditions. Currently, rotor noise emissions are controlled principally through the use of acoustic linings in the inner walls of the engine nacelle, but these linings are intended to reduce noise after it is generated rather than act upon the various sources of the noise. Numerous contemporary investigations have been conducted to develop an understanding of the various mechanisms by which fan stage noise is generated and to establish the relative importance of the various sources. Also, improved experimental techniques have been developed which better simulate conditions under which an engine operates in flight.

In the effort to reduce noise generated by the rotor, considerable effort has been focused on the region near the rotor tips. It is recognized that this region is a major source of noise because of the high tip speeds, the interaction of the rotor with the inlet boundary layer and turbulent flows from the rotor tips. One device designed to reduce the noise generated by the interaction between the rotor tips and the turbulent boundary layer along the nacelle walls is described in U.S. Pat. No. 3,730,639 issued to Christopher John Moore, et al.

It is common in turbofan engines to position a set of stationary inlet guide vanes immediately upstream of the rotor to turn the incoming airflow before it strikes the rotor. In engines of this type, additional rotor noise is generated by the interaction of the wake from the guide vanes with the rotor. In fact, it is believed that guide vane wakes are a major cause of rotor noise in such engines.

A large part of these wake disturbances are attributed to the accumulation of low energy air near the radially outermost tips of the guide vanes. This accumulation is the result of secondary flows caused by (1) radial pressure gradients along the vane blades which tend to cause low energy air in the blade wakes to move radially outward and (2) the passage of the fan casing boundary layer through the inlet guide vanes. It has been generally believed that a device for bleeding the inlet boundary layer as proposed by Moore, et al, would not be effective when inlet guide vanes were present because it acted on only a small portion of the vane wakes. It was felt that to materially reduce the fan noise, the entire vane wake would have to be controlled.

Recent studies by the inventors have indicated that, on the contrary, that rotor noise is largely due to flow distortions in the radially outermost portions of the vane wakes. These studies have also suggested that this noise can be substantially reduced by bleeding a small portion of the air flowing through the fan duct from a region located near the inner nacelle (or fan casing) walls and between the radially outermost tips of the inlet guide vanes and rotor blades. By this invention, a moderate to high bypass ratio turbofan engine is enclosed in the nacelle having a controllable bleed duct system. The duct system has one or more openings located circumferentially around the inner nacelle wall between the tips of the guide vanes and rotor blades. When the bleed system is in operation airflow entering these openings is carried out of the fan duct upstream of the rotor and may be exhausted into the atmosphere. In the preferred embodiment, the flow through the system is controlled by one or more doors located at the bleed duct exits on the outer nacelle wall. Also described is a second duct system which merges with the bleed ducts and permits the injection of high energy air flow into the bleed flow to facilitate its removal from the fan duct.

This invention has direct application to current, moderate-to-high bypass ratio turbofan engines and can be incorporated with only moderate structural changes. When in operation, the bleed system will cause a minor reduction in engine thrust. Because it is intended that this invention be used only during approach and take-off, cruise thrust will not be effected. Accordingly, it can be seen that a principle advantage of this invention is that it provides a reduction in rotor noise without affecting engine cruise performance.

SUMMARY OF THE INVENTION

In summary, this invention can be most broadly described as an improvement to a turbofan engine having a set of inlet guide vanes including means for removing a portion of the airflow from the fan duct downstream of the inlet guide vanes but upstream of the rotor. The invention further provides for a means for controlling the airflow through said removing means and a means for injecting high energy airflow into said removing means to facilitate the removal of air from the fan duct.

BRIEF DESCRIPTION OF THE DRAWINGS

The FIGURE shows a schematic sectional view of the forward portion, and particularly the fan stage, of a typical turbofan engine having a single rotor and a single set of inlet guide vanes positioned upstream of the rotor.

DESCRIPTION OF THE PREFERRED EMBODIMENT

In discussing the preferred embodiment of this invention, it should be understood that the term "nacelle" is used herein to describe the entire enclosure surrounding the turbofan engine and is intended to include other structural elements which commonly form a part of the internal flow surface such as the fan shroud and the fan casing. The nacelle is further referred to as having an inner wall which forms a generally cylindrical duct into which air is drawn from the atmosphere and acted upon by the engine. The nacelle also may have an outer wall which generally encloses the inner wall and may form the outer aerodynamic surface of the nacelle. The terms "upstream" and "downstream" refer to directions parallel to the axis of rotation of the rotor and the radial direction is assumed to be perpendicular to that axis.

The FIGURE shows a simplified schematic cross-section of the forward portion of a typical high bypass ratio turbofan engine including the fan stage. The nacelle has an inner wall 12, an outer wall 14, and an inlet lip 16 at its forward edge. Located within the nacelle is a single row or set of inlet guide vanes 18 (only one of which is shown in this view) each member of which extends radially between the center body 20 and the inner nacelle wall 12. The engine has a single rotor, only one blade of which is shown, located downstream of the inlet guide vanes. Downstream of the rotor is located a row of fan stators 24, a splitter 26, and a row of compressor stators 28 which extend between the splitter and the center body 20.

When the engine is in operation, airflow enters the area enclosed within the inner nacelle walls, herein referred to as the fan duct, from the left as indicated by the arrow. As the flow passes through the row of inlet guide vanes 18, it is turned and begins to rotate circumferentially within the fan duct as it passes toward the rotor 22.

In the preferred embodiment, one or more ducts 30 are located within the nacelle which have openings 32 in the inner nacelle wall or fan casing. A single annular opening which extends circumferentially around the inner nacelle wall without interruption or obstruction is most ideal from an acoustical standpoint, but some structural means must be provided for the carry the nacelle loads through the duct area.

Because of the structural requirements of certain nacelles or because of the location of equipment between the inner and outer nacelle walls, it may not be possible to duct the flow from each opening directly into the atmosphere as shown. In this case, it may be necessary to collect the flow in a series of plenum chambers located in convenient locations between the nacelle walls before it is finally exhausted into the atmosphere.

Flow through the duct system may be controlled with one or more doors 34 which are operably connected to the outer nacelle walls at the duct exits. When the doors are opened, air is permitted to flow through the ducts and into the atmosphere.

It should be obvious that a wide variety of other doors or valves may be adapted to control the flow through the bleed ducts, and the selection of a suitable means for this purpose should be obvious to those skilled in the art.

Various alternate means for ducting and flow control which can be applicable to the inlet guide vane bleed system are found in U.S. Pat. application Ser. No. 679,946 by L. A. Schaut and R. A. Zimbrick filed Apr. 26, 1976 and entitled "Turbofan Engine Nacelle having Stator Bypass Doors". Those means described in that application are regarded by the inventors herein as mechanical equivilence of the ducting and flow control means described in this application.

Also located in the nacelle is a second duct system for carrying high energy air which merges with bleed duct system 30. When the bleed system is in operation, air traveling through the fan duct near inner nacelle wall 12 passes through inner guide vanes 18 and toward entrance 32 of bleed duct 30. The tendancy of that air to enter the bleed duct system will depend upon the pressure gradient within the ducts. To insure that air is drawn into the system as desired, high energy air traveling through duct 36 is injected into duct 30 near entrance 32 as indicated by arrow C so as to eject the flow through the bleed duct and into the atmosphere.

Finally although only one specific embodiment of this invention has been illustrated and described, it is to be understood that obvious modifications may be made of it without departing from the true scope and spirit of this invention.

What is claimed is:

1. In combination with a gas turbine engine of the type commonly known as a turbofan including an annular nacelle having an inner wall which forms a fan duct for the passage of air through the engine, a rotor having a plurality of radially oriented, circumferentially spaced blades and a set of radially oriented inlet guide vanes disposed within said fan duct forward of said rotor, the improvement comprising:

means for removing a portion of said air from said fan duct downstream of said inlet guide vanes but upstream of said rotor, said means including a bleed duct having an opening on said inlet guide vane but upstream of said rotor; and means for injecting high energy flow into said bleed duct to facilitate removal of said portion of air.

* * * * *